United States Patent [19]

Heitmann et al.

[11] Patent Number: 4,849,994
[45] Date of Patent: Jul. 18, 1989

[54] METHOD OF TRANSMITTING DIGITALLY CODED SIGNALS

[75] Inventors: Jürgen Heitmann, Alsbach-Hähnlein; Rolf Loos, Eppertshausen, both of Fed. Rep. of Germany

[73] Assignee: Robert Bosch GmbH, Stuttgart, Fed. Rep. of Germany

[21] Appl. No.: 894,304

[22] Filed: Aug. 7, 1986

[30] Foreign Application Priority Data

Aug. 16, 1985 [DE] Fed. Rep. of Germany ....... 3529435

[51] Int. Cl.$^4$ ................. H04L 7/00; H04B 14/04
[52] U.S. Cl. ............................. 375/114; 375/106; 375/25
[58] Field of Search ............... 375/106, 25, 113, 114; 358/12, 13, 141; 360/40; 380/10

[56] References Cited

U.S. PATENT DOCUMENTS

| | | | |
|---|---|---|---|
| 3,961,137 | 6/1976 | Hutt et al. | 375/114 |
| 4,027,178 | 5/1977 | Larner | 375/113 |
| 4,303,942 | 12/1981 | Fukuda et al. | 375/113 |
| 4,353,130 | 10/1982 | Carasso | 375/114 |
| 4,649,549 | 3/1987 | Halpern et al. | 375/106 |
| 4,697,277 | 9/1987 | van Rassel | 375/106 X |

FOREIGN PATENT DOCUMENTS

| | | |
|---|---|---|
| 8501402 | 3/1985 | European Pat. Off. . |
| 2828219 | 1/1980 | Fed. Rep. of Germany . |
| 3113397 | 10/1982 | Fed. Rep. of Germany . |
| 3133023 | 4/1983 | Fed. Rep. of Germany . |
| 2083322 | 3/1982 | United Kingdom . |
| 2104755 | 3/1983 | United Kingdom . |
| 2105953 | 3/1983 | United Kingdom . |
| 2107558 | 4/1983 | United Kingdom . |

OTHER PUBLICATIONS

Periodic Publication "Nachrichtentechn., Elekron", Berlin 34 (1984) 2, pp. 42–44.

Goldberg et al., "Optical Television Link Employing a Digitally Modulated Laser", SMPTE Journal, Jun. 1979, vol. 88, pp. 414–420.

Primary Examiner—Stephen C. Buczinski
Assistant Examiner—Linda J. Wallace
Attorney, Agent, or Firm—Frishauf, Holtz, Goodman & Woodward

[57] ABSTRACT

For transmission of serial digitally coded signals over a path having a high-pass frequency characteristic synchronizing signals are transmitted in synchronizing word pairs at the beginning of each data block in which the synchronizing words are either identical or else both have the same number of bits of each of the two binary logic levels, for reduction of d.c. and low-frequency components while permitting the choice of a synchronizing signal word which occurs at most rarely in a television video signal, for example.

5 Claims, 1 Drawing Sheet

METHOD OF TRANSMITTING DIGITALLY CODED SIGNALS

This invention relates to a method of serial transmission of digitally coded signals on a path having a high-pass characteristic, in which the information is subdivided into data blocks which are separated from each other by synchronizing words.

Digitally coded electrical signals are often transmitted over frequency-band-limited paths. The upper frequency limit of the transmission path can require a reduction of the highest frequency present in the signal. The transmission of very low frequencies is just as often limited or not possible at all, however.

Thus in the case of magnetic recording of digital signals it is therefore necessary to recode into codes free of d.c. component. A large number of proposals have become known for this purpose in the past.

A simple way of obtaining freedom from d.c. consists of adding a number of bits of the necessary binary level at the end of signal segments of prescribed length, for example the end of every data word, so that for the thus complemented signal section the numbers of L and H binary levels balance out. This trivial possibility is discarded in practice, however, since in most cases the channel capacity is limited, so that transmission should be performed with as little redundancy as possible.

A method of transmitting digitally coded signals is known from DE-AS No. 28 28 219 in which a given data train is subdivided into sequences with and without d.c. component and the sequences with d.c. component are replaced by sequences without d.c. component. It is necessary in such cases to make supplementary channel capacity available for the substitute signal.

In another known method (Goldberg et al, Optical Television Link in Playing a Digitally Modulated Laser, J. of SMPTE, Vol. 88 (June 1979), p. 414 ff.), the digital signal is inverted from sample to sample. This method provides satisfactory results only for particular contents of the signals to be transmitted.

A pulse code modulation system for recording and transmission channels of high-pass characteristic is known from DE-OS No. 31 13 397, corresponding to U.S. Pat. No. 4,491,869, in which the analog signal to be transmitted is limited to a bandwidth of half the sampling frequency of the digital signal and this digital signal is inverted from sample to sample. In this case a code is used that has a somewhat linear dependence of the number of bits of one logical level on the corresponding value of the analog signal. The provisions of this known system provide extensive freedom from d.c. components in the digital signals without requiring supplementary channel capacity as a result of the special features of scanning pictures for transmission.

Another pulse code modulation system is known from DE-OS No. 31 38 023, corresponding to U.S. Pat. No. 4,491,869 in which the spectral distribution of the signals is modified by suitable interlacing and, if necessary, bitwise or wordwise inversion, so that the signals are suited to the transmission properties of the path.

SUMMARY OF THE INVENTION

It is an object of the present invention to avoid the difficulties and limitations of the above-described methods for transmission and recording of bi-level digital signals in a high-pass medium, i.e. in a medium unfavorable to transmission at low frequency.

Briefly, at the beginning of every data block at least one pair of bi-level digital synchronizing words is provided which corresponds as perfectly as possible to the transmission conditions of the path. Thus, the synchronizing words of a word pair can advantageously be identical. It is also desirable for each synchronizing word to have the same number of bits of each of the two binary logic levels.

The method of the invention has the advantage that the low-frequency component of the signal remains low even in the individual synchronizing words. There is the further advantage that pairs of synchronizing words can always be used which correspond to a signal jump of particular size and rarely appear in the signal to be transmitted, and then only as single (unrepeated) words, in order to prevent mis-synchronization.

The invention contemplates various refinements further described below, one of which is of particular advantage, increasing the reliability of synchronization by evaluation of the spacing between a number of successive synchronizing word pairs, for checking the regularity of their appearance.

BRIEF DESCRIPTION OF THE DRAWING

The invention is further described by way of illustrative example with reference to the annexed drawing, in which.

DESCSRIPTION OF THE ILLUSTRATED EMBODIMENT

Figure 1:
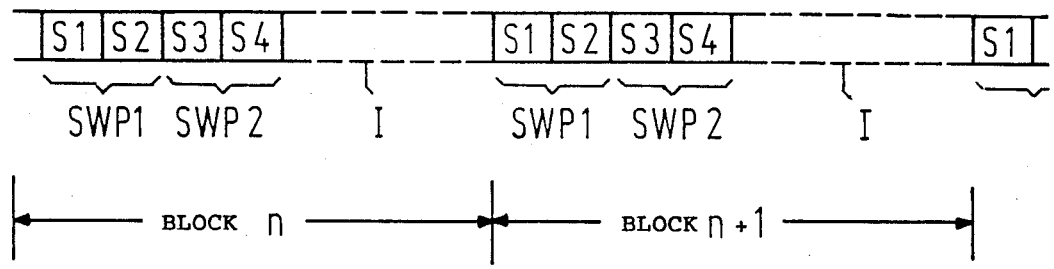
FIG. 1 is a schematic representation of a section of a serial data stream having synchronizing word pairs distributed therein.

FIG. 1 shows a section of a serial data stream in which the information is transmitted subdivided into blocks in which the beginning of each block contains four synchronizing words S1, S2, S3 and S4. Each information block n, n+1, n+2 . . . begins with the synchronizing words S1, S2, which together constitute the synchronizing word pair SWP1. When a code of the smallest possible d.c. component is used in order to improve transmission reliability, the synchronizing words dispersed among the information should also conform to these requirements. For this reason each synchronizing word preferably consists of an 8-bit code of four zeros and four ones. Furthermore, for improving the recognition reliability, there should be selected for synchronization a signal sequence which appears as rarely as possible in the video signal. In a code with a generally linear dependence of the number of bits of one logic level on the current value of the analog signal, it follows that the desired result would be obtainable by transmission of a video signal word pair corresponding to signal jumps. By further providing inverting provided for every other data word, it becomes desirable for a synchronizing word pair to be constituted of two identical 8-bit words. Such a signal jump in the video signal is the rarer the bigger the jump is. The synchronizing word combination should be taken from the code table of any code which corresponds to this requirement. In a code according to patent application DE-OS No. 31 13 397 cited above, that would be, the value 94 with, at the same time, simultaneous sequencing of the values 93 and 94. The digital word for the value 94 is 1011 0001. The synchronizing word pair SWP1 is produced by repeating the 8-bit value for the value 94 and in complete form then is 1011 0001 1011 0001.

If in the transmission of the serial data wordwise interlace according to DE-OS No. 31 38 023 corresponding to U.S. Pat. No. 4,534,037 is used, the synchronizing information can advantageously consist of another pair SWP2 of identical words, composed of the synchronizing words S3 and S4 and having a fixed spacing from the synchronizing word pair SWP1. The synchronizing word pair SWP2 can be constituted similarly to the synchronizing word pair SWP1 without substantial reduction of the transmission reliability or of the reliability of synchronizing word recognition. Following the synchronizing word S4 the information I to be transmitted follows in each transmission block n, n+1, n+2 . . .

Figure 2:
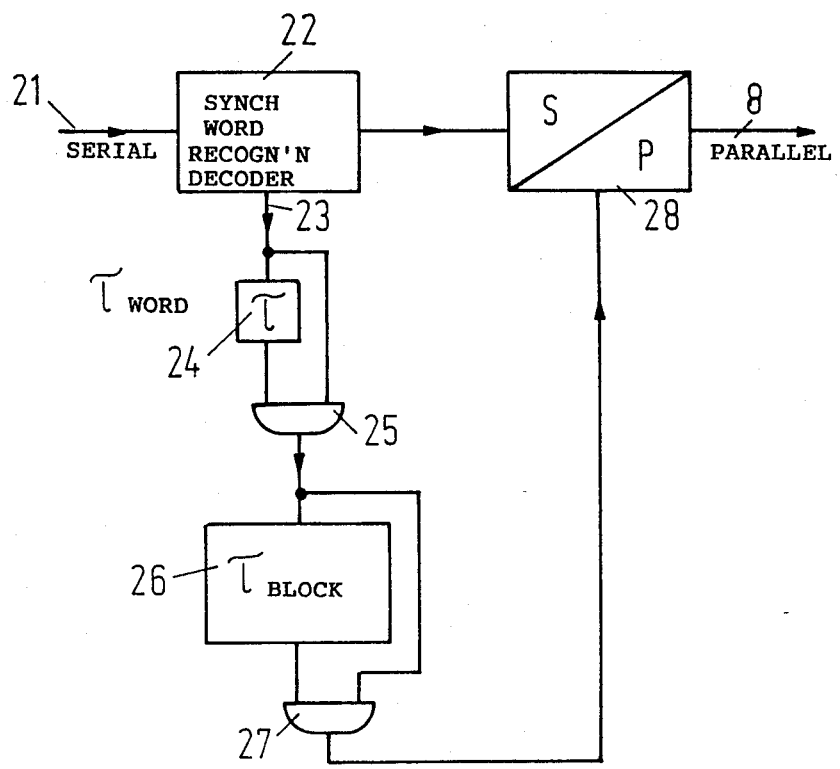
FIG. 2 is a block circuit diagram for a serial to parallel conversion of data in accordance with the method of the invention.

The serial data stream according to FIG. 1 is provided to the input 21 in the circuit shown in FIG. 2. The synchronizing word recognition circuit 22 recognizes the synchronizing words in the data stream running through the circuit and produces a pulse at a output 23 whenever such a synchronizing word appears. A first delay unit 24 is connected to the output 23 of the synchronizing word recognition circuit 22, having a delay that corresponds to the time spacing of two identical synchronizing words at the beginning of every block. The output and input of the delay circuit 24 are correlated by an AND-gate 25 which accordingly produces a pulse only when the first and second synchronizing word, with wordwise inverting, for example, S1 and S3 or S2 and S4, have been properly recognized. In addition, for increasing the recognition reliability, the signal from the output of the AND-gate 25 is supplied to another delay circuit 26 which has a delay time corresponding to the block length n, n+1, n+2 . . . The output and input of this second delay circuit 26 are correlated with each other by another AND-gate 27, so that a signal appears at the output of the AND-gate 27 only when synchronizing word pairings are also properly recognized again after the running of exactly one block length. The output signal of the AND-gate 27 provides a "framing pulse" to assure synchronization of the serial to parallel converter 28 which converts the serial data signal running through the synchronizing word recognition circuit 22 into an 8-bit wide parallel data signal.

If alternate words have been inverted before transmission, of course, they should be again inverted upon reception to restore their original form before going to the circuit of FIG. 2.

Although the invention has been described with reference to a particular illustrative example, it will be recognized that modifications and variations are possible within the inventive concept.

It should be noted that in words containing the same number of 1's and 0's, a signal jump can be simulated by putting all the 1's in the most significant bit positions, and then using a system in which successive data words are inverted. Two successive identical signal words will then produce a signal jump.

We claim:

1. Method of transmitting, as a serial data stream, a bi-level digitally coded signal composed of successive data blocks each composed of a predetermined even number of data words, said data words respectively corresponding to successive samples of an analog signal, over a path having a high-pass characteristic, comprising the steps of:

intermittently transmitting a repeated predetermined sequence of at least one pair of synchronizing words of which the words of said pair are mutually identical and appear in only a single synchronizing word pair transmitted in each transmission of the sequence, each transmission of the sequence being followed by the transmission of a said data block and immediately following transmission of a preceding data block except when the transmission of the sequence precedes an initial data block of a transmission including a plurality of said data blocks, and for said at least one synchronizing word pair the word appearing therein being selected to correspond to a value of said analog signal which represents insertion of a maximum signal jump of said analog signal in the serial data stream, and before said intermittently transmitted sequence and said data blocks are transmitted over a path having a high-pass characteristic, inverting alternate words of said sequence and data blocks and thereafter transmitting said data blocks, each preceded by said sequence, as modified by alternate word inverting, over a path having a high-pass characteristic.

2. Method according to claim 1 in which each said intermittently transmitted sequence of at least one pair of synchronizing words comprises a plurality of synchronizing words.

3. Method according to claim 1, wherein the words of said at least one pair of synchronizing words each have the same number of bits of each of the two binary logic levels and wherein said signal jump of said analog signals is of the maximum value consistent with said synchronizing words having the same number of bits of each of the two binary logic levels.

4. Method of transmitting, as a serial data stream, a bi-level digitally coded signal composed of successive data blocks each composed of a predetermined even number of data words respectively corresponding to successive samples of an analog video signal and coded in a code having an approximately linear dependence of the number of bits of a particular binary logic level on the corresponding value of said analog signal, over a path having a high-pass characteristic, comprising the step of:

intermittently transmitting respective sequences each of a predetermined even number of preliminary data words, each said sequence beginning with a pair of synchronizing words of which the words of said pair are mutually identical and appear in not more than two synchronizing word pairs transmitted in each of said sequences, each transmission of a said sequence being immediately followed by the transmission of a said data block and immediately following transmission of a preceding data block except when transmission of the sequence precedes an initial block of a transmission including a plurality of said data blocks, the paired synchronizing words beginning each said sequence being identical with each other and for said synchronizing word pair beginning each said sequence the word appearing therein being selected to correspond to a value of said analog signal which represents insertion of a maximum signal jump of said analog signal in the serial data stream, and before said intermittently transmitted preliminary data word sequences and said data blocks respectively following said sequences are transmitted over a path having a high-pass characteristic, inverting alternate words of said sequences and said data blocks, and thereafter transmitting said sequences and said data blocks, as modified by alternate word inverting, over a path having a high-pass characteristic.

5. Method according to claim 4, wherein each said intermittently transmitted sequence also comprises at least one additional pair of mutually identical synchronizing words.

* * * * *